United States Patent
Kawase

(10) Patent No.: US 7,637,340 B2
(45) Date of Patent: Dec. 29, 2009

(54) STRADDLE TYPE VEHICLE

(75) Inventor: Masao Kawase, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 366 days.

(21) Appl. No.: 11/549,876

(22) Filed: Oct. 16, 2006

(65) Prior Publication Data

US 2007/0137914 A1 Jun. 21, 2007

(30) Foreign Application Priority Data

Oct. 17, 2005 (JP) .............................. 2005-302290
Sep. 14, 2006 (JP) .............................. 2006-249869

(51) Int. Cl.
*B60K 15/063* (2006.01)
*B62D 61/02* (2006.01)

(52) U.S. Cl. ..................... 180/219; 180/68.3; 180/68.5; 280/835

(58) Field of Classification Search ................. 180/219, 180/227, 228, 229, 68.5, 68.1, 68.3, 908, 180/210, 833, 835; 280/833, 835
See application file for complete search history.

(56) References Cited

U.S. PATENT DOCUMENTS

| | | | | |
|---|---|---|---|---|
| 4,700,799 A | * | 10/1987 | Kawano | 180/219 |
| 4,813,511 A | * | 3/1989 | Yamaguchi et al. | 180/219 |
| 4,871,041 A | * | 10/1989 | Saito et al. | 180/219 |
| 4,940,111 A | * | 7/1990 | Nogami et al. | 180/219 |
| 6,073,719 A | * | 6/2000 | Ohmika et al. | 180/219 |
| 7,377,552 B2 | | 5/2008 | Miyabe | |
| 2003/0217884 A1 | * | 11/2003 | Kawamoto | 180/292 |
| 2005/0045399 A1 | * | 3/2005 | Kudo et al. | 180/219 |
| 2006/0066092 A1 | * | 3/2006 | Miyabe | 280/833 |

FOREIGN PATENT DOCUMENTS

| | | |
|---|---|---|
| JP | 55127269 A | 10/1980 |
| JP | 56-82677 | 7/1981 |
| JP | 01178093 A | 7/1989 |

OTHER PUBLICATIONS

European search report for corresponding European application 06021778 lists the references above.

* cited by examiner

*Primary Examiner*—Anne Marie M Boehler
(74) *Attorney, Agent, or Firm*—Hogan & Hartson LLP

(57) ABSTRACT

A straddle type vehicle with sufficient fuel tank capacity and a simplified battery layout design. An engine is suspended from and attached to main pipes. A fuel tank is positioned rearward of the engine. An air cleaner is fixed to middle pipes of the main pipes above the engine. A battery is fixed to the middle pipes at a position between the fuel tank and the air cleaner.

7 Claims, 6 Drawing Sheets

[FIG. 1]
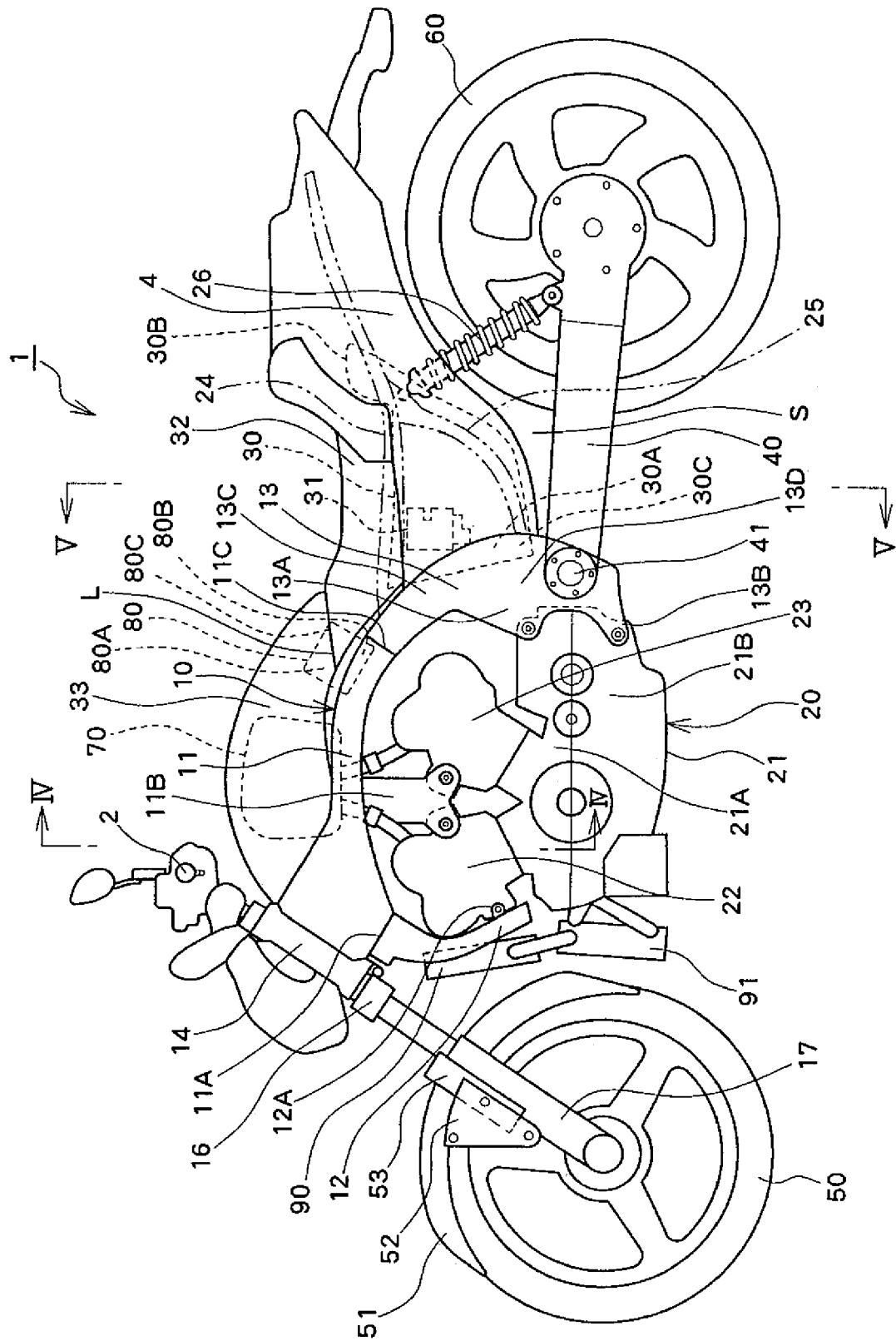

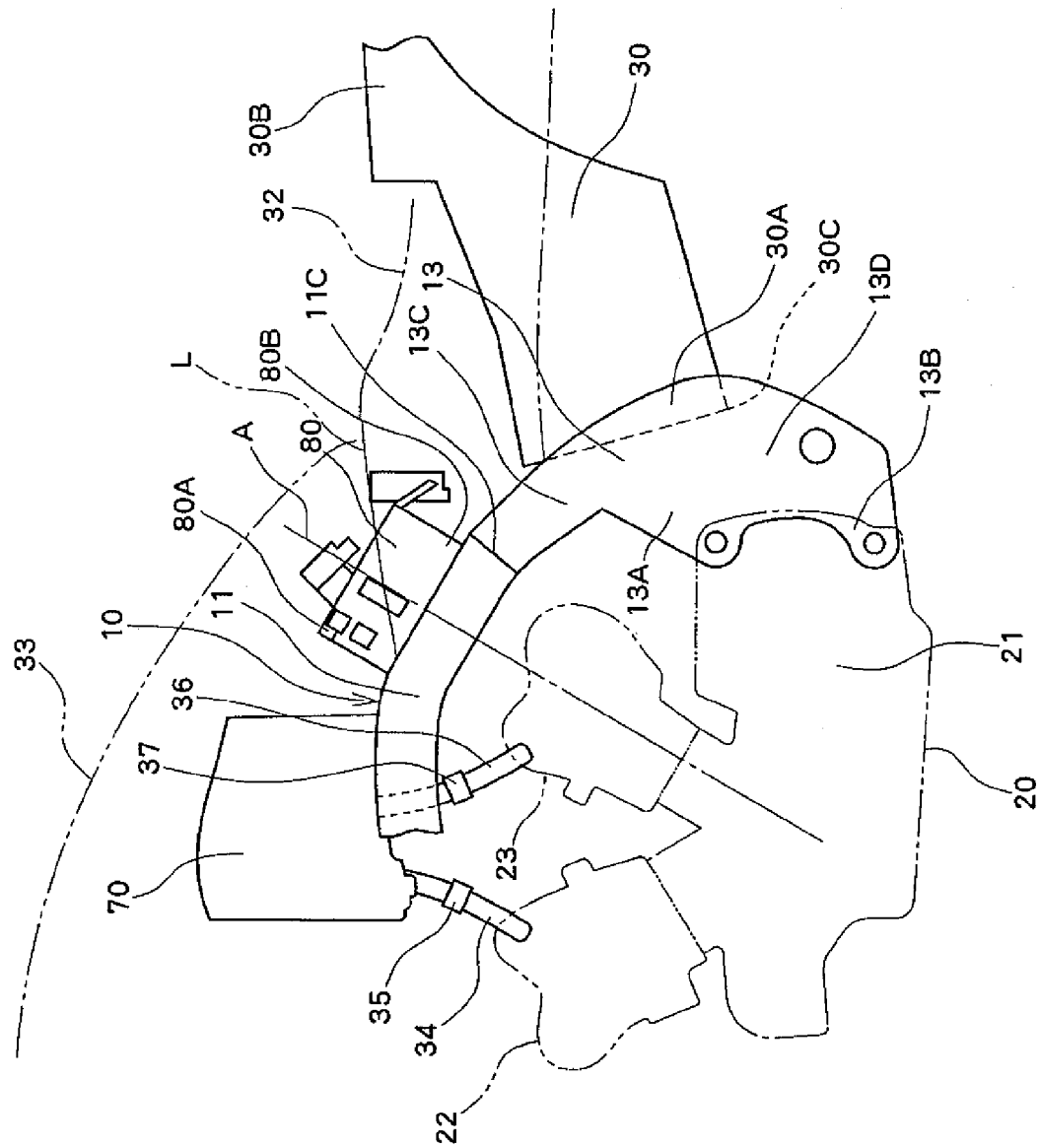
[FIG. 2]

[FIG. 3]
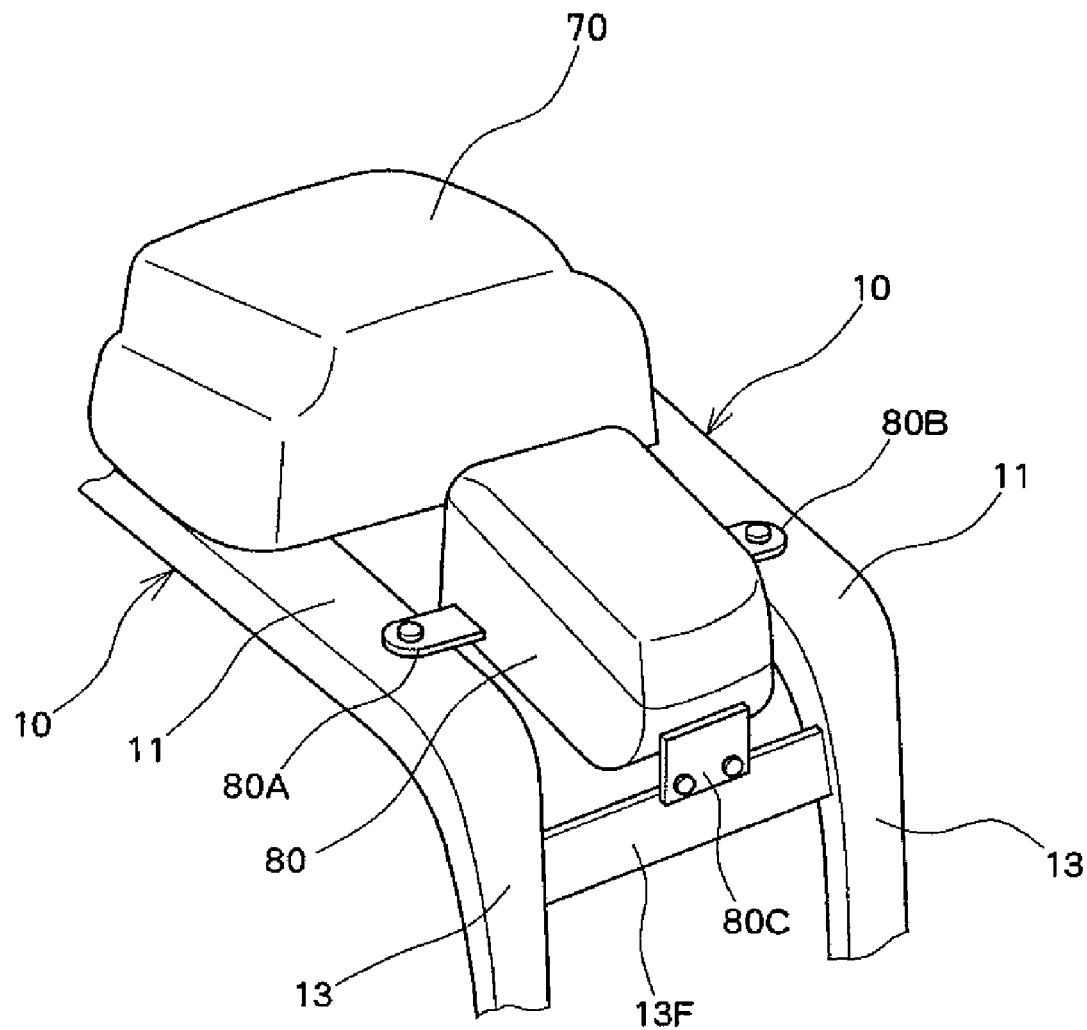

[FIG. 4]
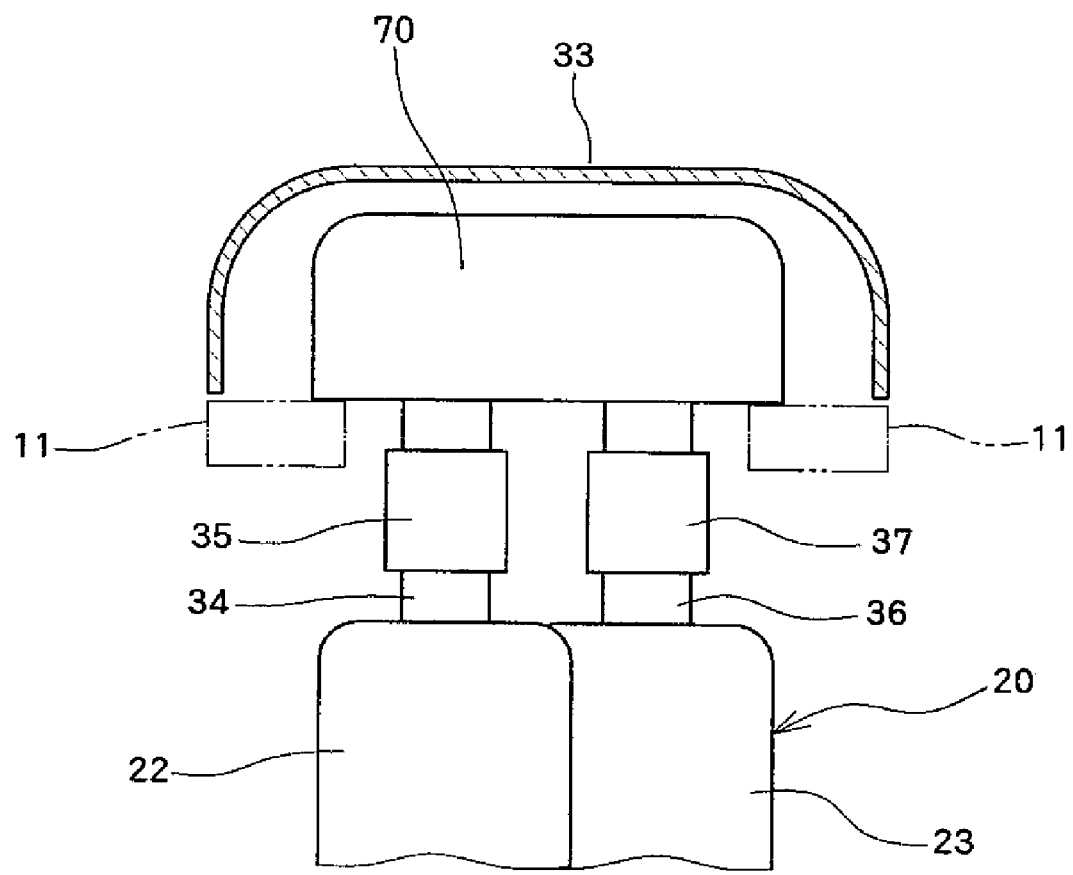

[FIG. 5]
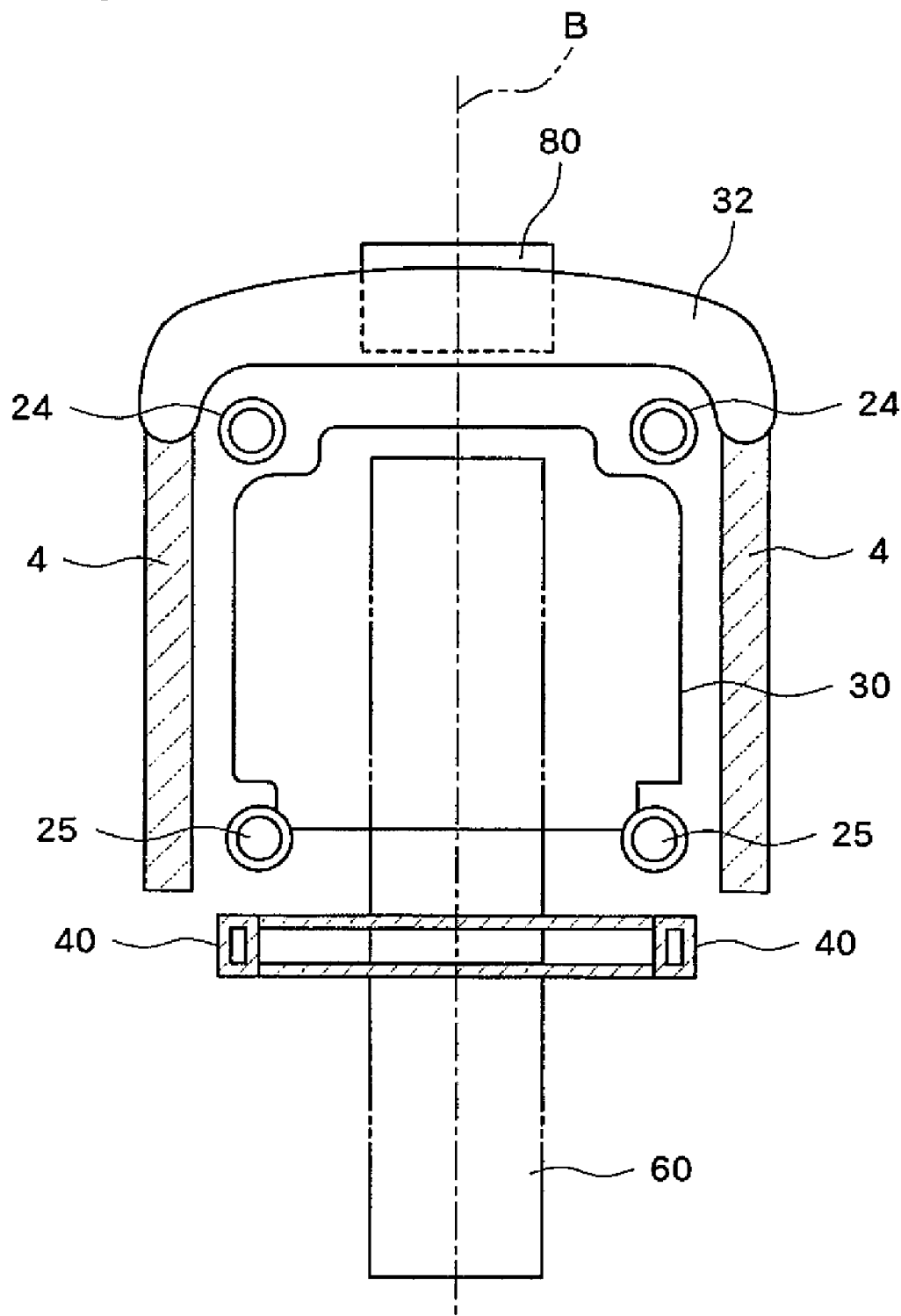

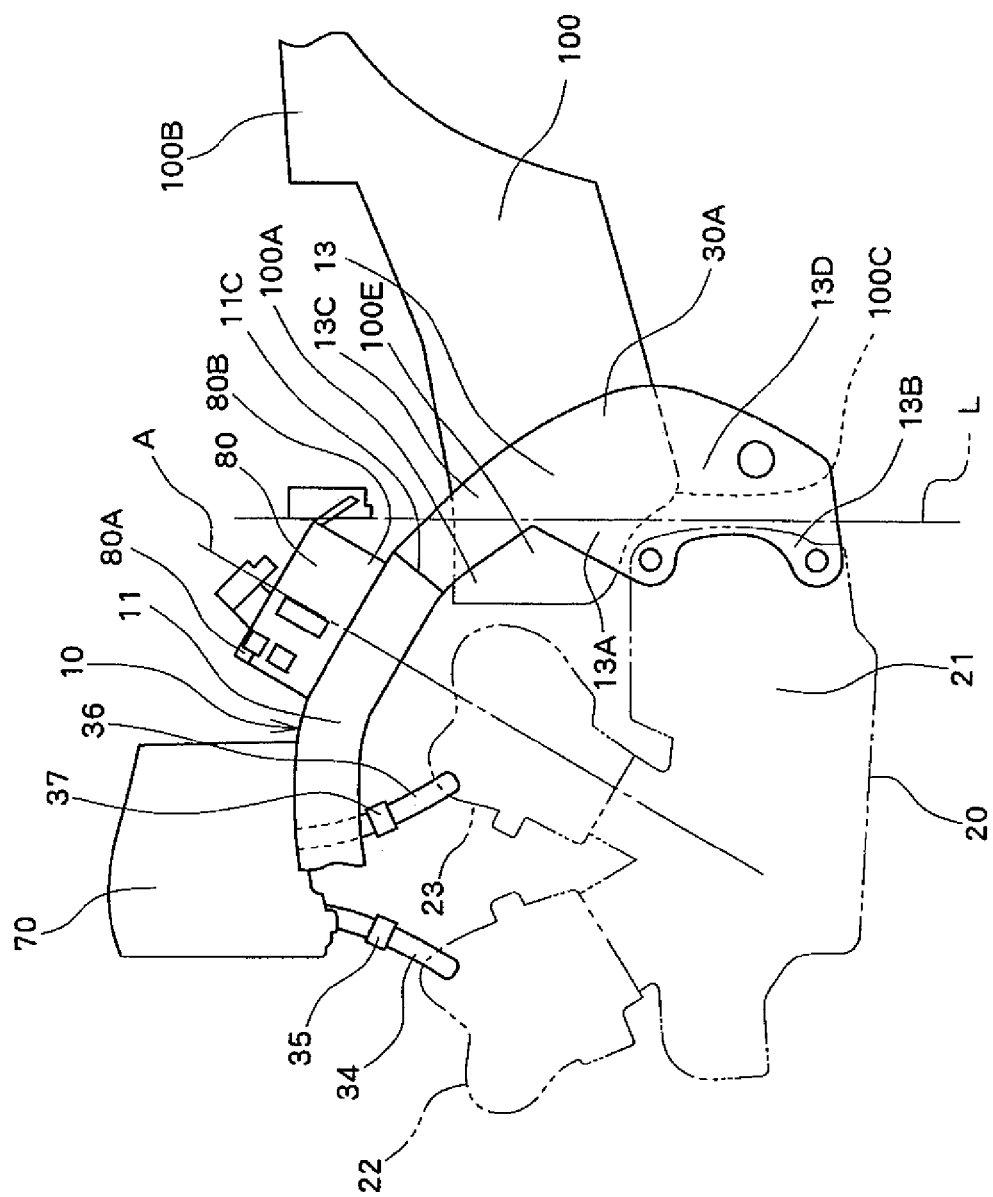
[FIG. 6]

STRADDLE TYPE VEHICLE

RELATED APPLICATIONS

This application claims the benefit of priority under 35 USC 119 of Japanese patent application nos. 2005-302290, filed on Oct. 17, 2005, and 2006-249869, filed Sep. 14, 2006, which applications are hereby incorporated by reference in their entireties.

BACKGROUND OF THE INVENTION

1. Field of the Invention

The present invention relates to a straddle type vehicle such as, for example, a motorcycle.

2. Description of Related Art

Generally, in motorcycles, an engine is suspended from and attached to a frame of a vehicle body. A fuel tank is generally attached to the frame above the engine. In one conventional motorcycle, a battery is placed between the engine and a fuel tank positioned above the engine (for example, see JP-A-Sho 56-82677).

However, because the battery of JP-A-Sho 56-82677 is placed below and adjacent to the fuel tank, the battery may diminish the capacity of the fuel tank. If the fuel tank is upsized to ensure sufficient capacity, there is another problem in that the height of the vehicle increases. Moreover, because the battery is positioned in a narrow space between the fuel tank and the engine, the battery layout design is difficult.

SUMMARY OF THE INVENTION

The present invention is made in view of these problems and provides a straddle type vehicle that ensures sufficient fuel tank capacity and simplifies the battery layout design.

A straddle type vehicle according to the present invention includes an air cleaner disposed above an engine, a battery disposed rearward of the air cleaner and above the engine, and a fuel tank disposed rearward of the battery, in which a top end of the fuel tank is positioned lower than a top end of the battery, and a bottom end of the fuel tank is positioned lower than a bottom end of the battery.

Because the fuel tank is disposed rearward of the battery, the battery and the fuel tank are held in a non-interfering state with each other, and the tank capacity of the fuel tank is easily assured. Also, because the air cleaner and the battery are disposed above the engine, the height of the vehicle is kept lowered in comparison with an arrangement in which the fuel tank is disposed above the engine. Further, because the bottom end of the fuel tank is positioned lower than the bottom end of the battery, the height of the vehicle is kept lowered. In addition, the battery layout is simplified in comparison with an arrangement in which the battery is positioned in a narrow space between the fuel tank and the engine in a vertical direction of the vehicle.

In one aspect of the present invention, the air cleaner protrudes upward from a top surface of the frame, the fuel tank protrudes from a top end of the frame to the top surface, and the battery is placed between the fuel tank and the air cleaner. As thus constructed, the battery is placed in the space defined between the air cleaner and the fuel tank, while ensuring the capacity of the air cleaner and fuel tank.

In another aspect of the present invention, a cover covering the air cleaner and the battery and a seat covering a top of the fuel tank are provided. In this inventive structure, the height of the vehicle is kept lower in comparison with a structure in which the fuel tank covers the respective tops of the air cleaner and the battery.

In a further aspect of the present invention, the battery is placed at a joining portion of the cover and the seat and is therefore easily attached or detached from a location above the vehicle only by removing the cover and the seat.

In a further aspect of the present invention, the battery is laid along a bending surface of the frame. As thus constructed, the battery does not protrude upward and can form a joining configuration of the cover and the seat.

In a further aspect of the present invention, the engine is a V-type engine having a front cylinder and a rear cylinder, and the battery is positioned above the rear cylinder and on an axis of the rear cylinder. As thus constructed, wires connecting the engine and the battery to each other can be easily attached or detached just by removing the cover and the seat.

In a further aspect of the present invention, the fuel tank, at least in part, protrudes forward beyond a rear end of the battery. This construction increases the fuel tank capacity to the extent that the fuel tank protrudes forward more than the rear end of the battery.

In a further aspect of the present invention, a fuel pump disposed in the fuel tank is positioned rearward of a rear end of the battery. This construction holds the fuel pump in a non-interfering state with the battery so that layout of the fuel pump is simplified.

In a further aspect of the present invention, a frame extending in a longitudinal direction of the vehicle has, at a rear portion thereof, a rear frame extending downward toward a rear portion of the engine, a swing arm is coupled with the rear frame for swing movement, a rear wheel is coupled with the swing arm, and the fuel tank, at least in part, is placed in a space surrounded by the rear frame, the swing arm and the rear wheel in a side elevational view. In this construction, the fuel tank is easily placed in the space surrounded by the rear frame, the swing arm and the rear wheel so that fuel tank capacity is assured.

In a further aspect of the present invention, a pair of rear frames extends in a vertical direction behind the engine, and the rear frames and the fuel tank partially overlap with each other in a side elevational view. In this construction, the fuel tank is easily placed in a space between the pair of rear frames so that fuel tank capacity can be increased.

The straddle type vehicle of the present invention includes an air cleaner disposed above an engine, a battery disposed rearward of the air cleaner and above the engine, and a fuel tank disposed rearward of the battery, with a top end of the fuel tank positioned lower than a top end of the battery, and a bottom end of the fuel tank positioned lower than a bottom end of the battery. Because the fuel tank is disposed rearward of the battery, the battery and the fuel tank are held in a non-interfering state with each other, and the fuel tank capacity is assured. Because the air cleaner and the battery are disposed above the engine, the height of the vehicle is kept lowered in comparison with an arrangement in which the fuel tank is disposed above the engine. Because the bottom end of the fuel tank is positioned lower than the bottom end of the battery, the height of the vehicle is kept lowered. In addition, battery layout is simplified in comparison with an arrangement in which the battery is positioned in a narrow space between the fuel tank and the engine in a vertical direction of the vehicle.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a motorcycle according to an embodiment of the present invention.

FIG. 2 is a partial and enlarged view of a main frame, an engine, a fuel tank, an air cleaner and a battery of the motorcycle of FIG. 1.

FIG. 3 is a perspective view of the main pipe, the air cleaner and the battery of the motorcycle of FIG. 1.

FIG. 4 is a cross sectional view taken along line IV-IV of FIG. 1.

FIG. 5 is a cross sectional view taken along line V-V of FIG. 1.

FIG. 6 is a partial and enlarged view of a main frame, an engine, a fuel tank, an air cleaner and a battery according to a second embodiment of the present invention, viewed from the same location as that of FIG. 2.

DETAILED DESCRIPTION OF THE INVENTION

A straddle type vehicle according to an embodiment of the present invention is applied to a motorcycle and described with reference to FIGS. 1-5. A motorcycle 1 includes right and left main pipes 10, 10 (see FIG. 3), an engine 20, a fuel tank 30, an air cleaner 70 and a battery 80.

Main pipes 10 form a framework of the vehicle body. Each main pipe 10 includes a middle pipe 11 extending generally horizontally above engine 20 in a fore to aft direction of the vehicle body, a front pipe 12 having a top end welded to a front end 11A of middle pipe 11 and extending downward from front end 11A in front of engine 20, and a rear pipe 13, which is a rear frame, having a top end welded to a rear end 11C of middle pipe 11 and extending downward from rear end 11C in the rear of engine 20. Additionally, front end 11A of each middle pipe 11 is positioned in front of engine brackets 13A, 13B of rear pipe 13. Rear pipe 13 can be unitarily formed with each middle pipe 11.

An engine bracket 12A projects at a bottom end of each front pipe 12. A front cylinder 22 of engine 20 is fixed to engine brackets 12A. Engine brackets 11B are disposed at a mid portion of each middle pipe 11 in the longitudinal direction thereof. Engine bracket 11B extends downward from each middle pipe 11 toward a location between front cylinder 22 and a rear cylinder 23 of engine 20, and a bottom end thereof is separated in a fork configuration. Front cylinders 22 and rear cylinders 23 are fixed to the bottom ends of engine brackets 11B.

As shown in FIGS. 1 and 2, rear pipe 13 extends downward, while arcuately curving to turn toward a rear side of a pivot shaft 41, from rear end 11C of middle pipe 11. Each rear pipe 13 has an upper engine bracket 13A and a lower engine bracket 13B on its lower end, which are spaced apart vertically and project. An upper case 21A and a lower case 21B of engine 20 are fixed, respectively, to upper engine bracket 13A and lower engine bracket 13B. Rear pipes 13 overlap with a front portion 30A of fuel tank 30 in a side view. An upper part 13C of each rear pipe 13 is formed narrower in a side view relative to a lower part 13D thereof, which is formed wider in the side view.

A front end of a swing arm 40 is coupled with lower part 13D of rear pipe 13 via a pivot shaft 41 for swing movement. A rear end of swing arm 40 is coupled with a rotational shaft of a rear wheel 60 for rotation.

Seat rails 24 extending rearward from upper parts 13C of rear pipes 13 are fixed to main pipes 10 with bolts. A backstay 25 extending to curve obliquely upward and rearward is fixed to lower part 13D of each rear pipe 13 with bolts. A top end of each backstay 25 is fixed to a mid portion of seat rail 24 with bolts. A shock absorber 26 extends between the top end of backstay 25 and the rear end of swing arm 40.

A head pipe 14 is welded to the front ends of middle pipes 11. A pivot shaft (not shown) attached to a handle bar 2 is fitted into head pipe 14 for pivotal movement. The pivot shaft of handle bar 2 is fixed to a mid portion of an under bracket 16 in the longitudinal direction thereof. Under bracket 16 extends in a right and left direction. Right and left top ends of a front fork 17 (only one of them is shown) are inserted into right and left ends of under bracket 16 to be fixed. A front wheel 50 is coupled with a bottom end of front fork 17 for rotation. Additionally, outer covers 4 cover seat rails 24, back stays 25, fuel tank 30, etc. from an outside location.

Engine 20 is preferably a so-called V-type four cylinder engine including a crankcase 21 vertically divided into an upper case 21A and a lower case 21B. Right and left front cylinders 22 (only one of them is shown) extend obliquely upward and forward from a top front side of upper case 21A, and right and left rear cylinders 23 (only one of them is shown) are positioned behind front cylinders 22 and extend obliquely upward and rearward from the top rear side of upper case 21A. Engine 20 is suspended from and attached to main pipes 10 via engine brackets 11B, 12A, 13A and 13B.

Fuel tank 30 is positioned rearward of engine 20, and, more specifically, rearward of rear pipes 13 and below seat 32. Seat 32 covers fuel tank 30 from above. Fuel tank 30 is disposed rearward of battery 80.

Regarding fuel tank 30, a top end 30B thereof is positioned lower than a top end 80A of battery 80, and a bottom end 30C is positioned lower than a bottom end 80B of battery 80. Also, as shown in FIG. 1, fuel tank 30 is placed in a space S surrounded by rear pipes 13, swing arms 40 and rear wheel 60 in a side elevational view. Further, fuel tank 30 is positioned between the pair of rear pipes 13 to partially overlap rear pipes 13 in the side elevational view.

Fuel tank 30 is fixed to seat rails 24 and backstays 25 with bolts. As shown in FIG. 5, fuel tank 30 is generally configured as a rectangular shape when viewed from a rear side of the vehicle and is accommodated in a space surrounded by right and left outer covers 4, 4, seat 32 and swing arms 40. Also, the respective centers of battery 80, fuel tank 30 and rear wheel 60 extend along the center of the vehicle in a width direction, i.e., center line B of FIG. 5. Because right and left protrusions of battery 80 from the vehicle center are equal to each other, knee contacts made when a rider straddles the vehicle are even on both the right and left sides and the ride is improved.

Fuel tank 30 accumulates gasoline to be supplied to engine 20. A pump 31 positioned adjacent to rear pipes 13 for supplying fuel to engine 20 is placed on the front portion of fuel tank 30. Fuel pump 31 is positioned rearward of a rear end 80C of battery 80.

Air cleaner 70 removes foreign substances such as, for example, dust contained in air supplied to engine 20. As shown in FIG. 2, air cleaner 70 protrudes upward from top surfaces of middle pipes 11. Air cleaner 70 is disposed above engine 20 and is fixed to middle pipes 11 with bolts. Air cleaner 70 is covered by an exterior cover 33.

As shown in FIGS. 2 and 4, air cleaner 70 and front cylinders 22 are connected through front intake pipes 34. A front throttle body 35 for adjusting an amount of air intake introduced from air cleaner 70 into each front cylinder 22 is disposed at a mid portion of front intake pipe 34. Air cleaner 70 and rear cylinders 23 are connected through rear intake pipes 36. A rear throttle body 37 for adjusting an amount of air intake introduced from air cleaner 70 into each rear cylinder 23 is disposed at a mid portion of rear intake pipe 36.

Battery 80 stores electric power which is generated using a part of the output of engine 20 and supplies power to engine 20, lights, indicators (which are not shown), etc. in accordance with requirements thereof. As shown in FIGS. 2 and 3, battery 80 is generally formed as a rectangular parallelepiped and is positioned in front of fuel tank 30 and behind air cleaner 70. As shown in FIG. 2, battery 80 is arranged together with air cleaner 70 to protrude from top surfaces of middle pipes 11, and is placed at a joining portion L of exterior cover 33 and seat 32. As shown in FIG. 2, battery 80 is laid along bending surfaces of middle pipes 11. As shown in FIG. 5, the top end of battery 80 protrudes upward beyond seat 32.

Battery 80 is positioned above rear cylinders 23 and on and along axes A of rear cylinders 23. As shown in FIG. 3, battery 80 has brackets 80A, 80B, 80C attached, respectively, to right, left and rear surfaces thereof. Battery 80 is fixed to, for example, rear ends of middle pipes 11 and to a coupling plate 13F coupling right and left middle pipes 11 via brackets 80A, 80B, 80C with bolts under a condition that a length of battery 80 in the fore to aft direction is larger than a length thereof in the width direction of the vehicle, i.e., the longitudinal direction of battery 80 is directed in the fore to aft direction. Battery 80 and air cleaner 70 are covered by exterior cover 33.

An upper radiator 90 and a lower radiator 91 are disposed between engine 20 and front wheel 50. Upper radiator 90 is fixed to front pipes 12, while lower radiator 91 is fixed to crankcase 21.

Brackets 52 are formed as a generally triangularly shaped plate member and attached to a front fender 51 and front fork 17. A cover 53 formed as a generally rectangularly shaped plate member which is arcuately bent in the width direction is fixed to each bracket 52 to cover front fork 17 from a front location to a side location. Cover 53 prevents foreign substances such as dust and insects from colliding against front fork 17 in a running state.

In motorcycle 1, battery 80 is disposed in a broad space defined between air cleaner 70 attached to middle pipes 11 and fuel tank 30 positioned behind rear pipes 13. The layout design of battery 80 thus is simplified.

In addition, fuel tank 30 is behind battery 80, top end 30B of fuel tank 30 is positioned lower than top end 80A of battery 80, and bottom end 30C of fuel tank 30 is positioned lower than bottom end 80B of battery 80. Battery 80 and fuel tank 30 thus are held in a non-interfering state with each other, and the capacity of fuel tank 30 is more easily assured. Also, because air cleaner 70 and battery 80 are disposed above engine 20, the height of the vehicle is kept lower in comparison with an arrangement in which fuel tank 30 is disposed above engine 20. Further, because bottom end 30C of fuel tank 30 is positioned lower than bottom end 80B of battery 80, the height of the vehicle is kept lower. Furthermore, because air cleaner 70, battery 80 and fuel tank 30 are offset from each other in the longitudinal direction of the vehicle, they are easily accessible from upper locations to facilitate maintenance and refueling.

Because battery 80 is positioned in front of fuel tank 30 and is sufficiently spaced apart from fuel tank 30, even though fuel tank 30 is large, fuel tank 30 and battery 80 are held in a non-interfering state with each other so that the capacity of fuel tank 30 is ensured.

Because battery 80 is disposed so that the longitudinal direction thereof is directed in the fore to aft direction, battery 80 does not project outward from the vehicle body in the right and left width direction. The width of the vehicle body between the knees of a rider straddling the vehicle body thus is narrowed to enhance the ride of the vehicle.

Because battery 80 is relatively heavy and is positioned adjacent to air cleaner 70 placed in the front portion of the vehicle, a load allotted to the front wheel can be large by battery 80 and the ride of motorcycle 1 is enhanced.

Because battery 80 is placed at joining portion L of exterior cover 33 and seat 32, battery 80 is easily maintained and exchanged by detaching exterior cover 33 and seat 32.

Because battery 80 is positioned above rear cylinders 23 and on axes A of rear cylinders 23, wirings (not shown) connecting engine 20 and battery 80 are easily maintained and attached or detached.

Meanwhile, each rear pipe 13 positioned on the rear side of main pipe 10 is arcuately bent. Thereby, when rear pipes 13 are coupled with crankcase 21, the load from engine 20 is not locally or intensively applied to the bent portions of the main pipes as is the case in the conventional art. Instead, the load from engine 20 is equally given to all parts of main pipes 10, thereby enhancing the rigidity of main pipes 10.

Each rear pipe 13 extends downward, while arcuately curving to turn toward the rear side of pivot shaft 41, from the rear end of middle pipe 11. Thus, the load directed rearward from engine 20 and transmitted to main pipes 10 is more surely received by rear pipes 13, in comparison with a conventional structure in which the rear pipes extend straightly and generally perpendicularly downward from the respective rear ends of the front pipes to be connected to the crankcase. Thereby, the rigidity of main pipes 10 is enhanced and the performance and reliability of motorcycle 1 is improved.

FIG. 6 shows a second embodiment of the present invention. In this embodiment, the same components as those of the first embodiment are assigned with the same reference numerals and symbols, and descriptions thereof are not repeated.

Fuel tank 100 used in the second embodiment has a front portion 100A, a top end 100B and a bottom end 100C, similar to fuel tank 30 of the first embodiment, and is disposed at almost the same position as that of fuel tank 30.

However, fuel tank 100 of the second embodiment differs from the first embodiment in that the front side of front portion 100A is configured as a protruding portion 100E that protrudes forward beyond a line L extending through a rear end of battery 80.

In this embodiment, because the front side of front portion 100A of fuel tank 100 protrudes beyond the rear end of battery 80, the tank capacity of fuel tank 100 can be increased to the extent of protruding portion 100E that is protruded.

In this description, motorcycle 1 is but one example of a straddle type vehicle and the invention is not so limited. The present invention can be applied to other straddle type vehicles such as, for example, three-wheeled vehicles and buggy vehicles.

The particular embodiments of the invention described in this document should be considered illustrative, rather than restrictive. Modification to the described embodiments may be made without departing from the spirit of the invention as defined by the following claims.

The invention claimed is:

1. A straddle vehicle comprising:
   a V engine;
   an air cleaner disposed above an engine;
   a battery disposed rearward of the air cleaner and above the engine;
   a fuel tank disposed rearward of the battery;

a cover covering the air cleaner and the battery; and
a seat covering a top of the fuel tank, wherein
a top end of the fuel tank is positioned lower than a top end of the battery,
a bottom end of the fuel tank is positioned lower than a bottom end of the battery,
the battery is placed at a joining portion of the cover and the seat,
the battery is laid along a bending surface of a frame extending in a longitudinal direction of the vehicle, and
the engine has a front cylinder and a rear cylinder, and the battery is positioned above the rear cylinder and on an axis of the rear cylinder.

2. The straddle vehicle according to claim 1, wherein the battery is attached to the frame under a condition that a length thereof in a width direction of the vehicle is larger than a length thereof in a fore to aft direction of the vehicle.

3. The straddle vehicle according to claim 1, wherein the fuel tank, at least in part, protrudes forward beyond a rear end of the battery.

4. The straddle vehicle according to claim 1, wherein a fuel pump disposed in the fuel tank is positioned rearward more than a rear end of the battery.

5. The straddle vehicle according to claim 1, wherein the frame extending in a longitudinal direction of the vehicle has, at a rear portion thereof, a rear frame extending downward toward a rear portion of the engine, a swing arm is coupled with the rear frame for swing movement, a rear wheel is coupled with the swing arm, and the fuel tank, at least in part, is placed in a space surrounded by the rear frame, the swing arm and the rear wheel in a side elevational view.

6. The straddle vehicle according to claim 1, wherein a pair of rear frames extends in a vertical direction behind the engine, and the rear frames and the fuel tank partially overlap with each other in a side elevational view.

7. The straddle vehicle according to claim 1, wherein the vehicle is a motorcycle.

\* \* \* \* \*

UNITED STATES PATENT AND TRADEMARK OFFICE
CERTIFICATE OF CORRECTION

PATENT NO. : 7,637,340 B2
APPLICATION NO. : 11/549876
DATED : December 29, 2009
INVENTOR(S) : Masao Kawase It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 440 days.

Signed and Sealed this

Ninth Day of November, 2010

David J. Kappos
*Director of the United States Patent and Trademark Office*